United States Patent
Watts

(10) Patent No.: US 10,128,576 B2
(45) Date of Patent: Nov. 13, 2018

(54) RANDOMIZED SURFACE REFLECTOR

(71) Applicant: Associated Universities, Inc., Washington, DC (US)

(72) Inventor: Galen Kent Watts, Green Bank, WV (US)

(73) Assignee: Associated Universities, Inc., Washington, DC (US)

(*) Notice: Subject to any disclaimer, the term of this patent is extended or adjusted under 35 U.S.C. 154(b) by 614 days.

(21) Appl. No.: 15/144,207

(22) Filed: May 2, 2016

(65) Prior Publication Data

US 2017/0062947 A1 Mar. 2, 2017

Related U.S. Application Data

(62) Division of application No. 14/317,981, filed on Jun. 27, 2014, now Pat. No. 9,343,815.

(60) Provisional application No. 61/840,931, filed on Jun. 28, 2013.

(51) Int. Cl.
*G01S 7/40* (2006.01)
*H01Q 15/00* (2006.01)
*H01Q 15/14* (2006.01)
*H01Q 15/16* (2006.01)

(52) U.S. Cl.
CPC ........ *H01Q 15/147* (2013.01); *H01Q 15/0026* (2013.01); *H01Q 15/14* (2013.01); *G01S 7/40* (2013.01); *H01Q 15/0006* (2013.01); *H01Q 15/167* (2013.01)

(58) Field of Classification Search
CPC ........ G01S 7/40; H01Q 17/00; H01Q 17/008; H01Q 15/00; H01Q 15/0006; H01Q 15/0026; H01Q 15/14; H01Q 15/147; H01Q 15/148; H01Q 15/167; H01Q 15/18
USPC ....... 342/1–12, 165, 169–174; 343/755, 772, 343/775, 779, 781 R, 832, 912
See application file for complete search history.

(56) References Cited

U.S. PATENT DOCUMENTS

| | | | | |
|---|---|---|---|---|
| 5,202,700 | A * | 4/1993 | Miller | H01Q 19/17 343/840 |
| 5,204,680 | A * | 4/1993 | Allington | H01Q 15/0006 342/4 |
| 6,285,332 | B1 * | 9/2001 | Chandler | H01Q 19/195 343/756 |
| 6,729,756 | B2 | 5/2004 | Sezai | |
| 8,134,521 | B2 | 3/2012 | Herz et al. | |
| 2012/0113508 | A1 | 5/2012 | Coleman et al. | |

OTHER PUBLICATIONS

PCT Search and Patentability Report for PCT/US2014/044651, dated Jan. 2, 2015.

* cited by examiner

*Primary Examiner* — Khai M Nguyen
(74) *Attorney, Agent, or Firm* — REMENICK PLLC

(57) ABSTRACT

A metal plate of small, reflective cells of varying, random (within a limited rage) heights that reflect radio frequency energy such that individual reflective paths are of random length, adding neither constructively nor destructively, and thus not creating a standing wave condition between the reflective plate and the emitter or receiver is disclosed.

7 Claims, 3 Drawing Sheets

RANDOMIZED SURFACE REFLECTOR

REFERENCE TO RELATED APPLICATIONS

This application is a Divisional Application of U.S. Non-Provisional application Ser. No. 14/317,981 filed Jun. 27, 2104, which claims priority to U.S. Provisional Application No. 61/840,931 filed Jun. 28, 2013, both entitled "RANDOMIZED SURFACE REFLECTOR," the entire disclosures of which are hereby incorporated herein by reference.

RIGHTS IN THE INVENTION

This invention was made with United States government support under Cooperative Agreement Nos. AST-0956545 and AST-0223851, between the National Science Foundation and Associated Universities, Inc., and, accordingly, the United States government has certain rights in this invention.

BACKGROUND OF THE INVENTION

1. Field of the Invention

This invention relates to the field of antennas, and more particularly to the field of wideband antennas.

2. Introduction

There is an increasing interest in wideband, low noise receivers for the next generation radio telescopes. Ultra wideband receivers are essential for sweeping over large frequency ranges, frequency agility, detection of short duration pulses, multi-frequency imaging, and simultaneous observation of several spectral lines.

Traditionally, radio telescopes make use of feed horns for illuminating the parabolic aperture because of their simplicity, ease of excitation, versatility, large gain, and preferred overall performance. A feed horn is a horn shaped antenna used to convey radio waves between a waveguide or waveguide-coaxial transition at the transmitter and/or receiver and the antenna reflector. In receiving antennas, incoming radio waves are gathered and focused by the antenna's reflector on the feed horn, which electromagnetically couples them to a waveguide or waveguide-coaxial transition, which, in turn, couples the incoming radio signal to the receiver. Feed horns are used mainly at microwave (SHF) and higher frequencies.

Feed horn bandwidths are limited to less than an octave and, hence, typically a set of feed horns operating at different frequencies is used to observe over a wideband range. A feed for parabola is situated such that its phase center coincides with the focus of the parabola. Different frequency bands can be selected by changing the feed horns. In some cases, it is important to study a scientific phenomenon by observing a source simultaneously at different frequencies.

Typically, in the field of radiometry, smooth, metal surfaces are used to change the path of the energy of interest. Occasionally, two reflecting surfaces (or plates) are positioned such that a standing wave condition at particular frequencies develops between the two surfaces. Such a standing wave condition may be caused by the distance between the surfaces being an odd multiple of half the wavelengths and/or portions of the surfaces being parallel. A standing wave condition causes an undesired frequency dependence, which may affect the transmission path between the surfaces, thereby negatively affecting data obtained through the use of the surfaces.

Due to the sensitive nature of radiometry, it is often necessary to calibrate the receiver. One method of calibration is to use the receiver to measure temperature. Typically, the temperature of objects at different and known temperatures is measured to determine a calibration coefficient. When a receiver is in use on an antenna it can be difficult or impractical to provide enough known temperatures for a proper calibration. The feed horn, itself can be an object of known temperature by attaching a temperature sensor to the feed horn and thus reduce the difficulty of calibration. FIG. 1 schematically depicts a configuration where the feed horn is used to calibrate the radiometer. To measure the temperature of the feed horn 100, for example, a reflective surface 101 placed perpendicular to the axis of propagation is used to reflect the image of the feed horn back into itself in a manner such that the radiometer measures its own feed horn's temperature.

However, if a smooth surface is used to calibrate the receiver using the feed horn's temperature, a standing wave can be created between the feed horn and reflector and the resulting resonance can overwhelm the accuracy of the calibration. For example, standing waves 102, 103 and 104 can be formed at particular frequencies, which resonances may be read by the radiometer as a falsely stronger or weaker signal at those frequencies. Therefore, there is a need for a method of calibrating a receiver without creating a standing wave.

SUMMARY

The present invention overcomes the problems and disadvantages associated with current strategies and designs and provides new systems and methods of reflecting radio waves.

One embodiment of the invention is directed to a randomized surface reflector. The reflector comprises a plurality of electromagnetic wave reflective cells arranged so that each cell has a randomly determined height above a baseline.

Preferably, each cell is of a different height above the baseline then the height of adjacent cells. In a preferred embodiment, the random height is a random integer multiple of ¼ wavelength at a center frequency of a frequency band of interest. Preferably, the integer is between zero and twenty.

In a preferred embodiment, each cell is a square and the cells are arranged in a grid. Each cell preferably has sides that are greater than one wavelength at a lowest frequency of a frequency band of interest. Preferably, each cell has sharp corners and a flat top. In a preferred embodiment, the plate is comprised of a non-ferrous, conductive material. Preferably, the plate is comprised of a plurality of repeating sections of cells.

Another embodiment of the invention is directed to a method of calibrating a radiometer. The method comprises the steps of determining the attributes of a feed horn of the radiometer, constructing a randomized surface reflector based on the attributes of the feed horn, wherein the randomized surface reflector is comprised of a plurality of cells arranged on a grid, each cell having a randomly determined height above a baseline, obtaining an actual temperature of the feed horn, placing the randomized surface reflector adjacent to the feed horn so that the randomized surface reflector reflects the electromagnetic signals of the feed horn, measuring the radiometric temperature of the feed horn based on a signal reflected from the calibration surface, replacing the randomized surface reflector with an object of known temperature, measuring the temperature of the object of known temperature based on the signal emitted from the object, and calculating a calibration coefficient for the radiometer based on the actual temperature of the feed horn, the measured temperature of the feed horn, the actual temperature of the object, and the measured temperature of the object.

Preferably, the step of placing the randomized surface reflector further comprises placing the randomized surface reflector so that the distance between the feed horn and the randomized surface reflector is equal to the length of the side of the randomized surface reflector divided by twice the tangent of a 25 dB taper angle of the feed horn. In the preferred embodiment, the step of constructing a randomized surface reflector comprises constructing the sides of the randomized surface reflector so that a main lobe of the feed horn is contained within the perimeter of the randomized surface reflector to a power level greater than 25 dB below a power level at the center of the main lobe when the main lobe is centered on the randomized surface reflector.

Preferably, each cell is of a different height above the baseline then the height of adjacent cells. In a preferred embodiment, the random height is a random integer multiple of ¼ wavelength at a center frequency of a frequency band of interest. The integer is preferably between zero and twenty.

Each cell is preferably a square and the cells are arranged in a grid. Preferably, each cell has sides that are greater than one wavelength at a lowest frequency of a frequency band of interest. In a preferred embodiment, each cell has sharp corners and a flat top. Preferably, the plate is comprised of a non-ferrous, conductive material. Preferably, the plate is comprised of a plurality of repeating sections of cells.

Other embodiments and advantages of the invention are set forth in part in the description, which follows, and in part, may be obvious from this description, or may be learned from the practice of the invention.

BRIEF DESCRIPTION OF THE DRAWINGS

The invention is described in greater detail by way of example only and with reference to the attached drawings, in which.

DETAILED DESCRIPTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

The sensitivity of a radio telescope can be expressed as a $G/T_{sys}$ ratio, where G is the gain of the parabolic dish illuminated by a feed horn and $T_{sys}$ is the system noise temperature. Feed horns exhibiting wideband, low noise behavior are highly desirable for radio telescopes like the Square Kilometer Array (SKA) and the Frequency Agile Solar Radiotelescope (FASR). An ideal wideband feed for radio astronomy preferably possesses a constant impedance, constant beamwidth, constant phase center, low cross polarization, and an optimal beam pattern to illuminate a parabola over a wide bandwidth.

In order to achieve as close to an ideal wideband feed as possible, it is often necessary to calibrate a radio telescope. It has been surprisingly discovered that by randomizing the path length between the feed horn and a reflective surface, a standing wave condition does not develop during the feed horn receiver calibration. The reflective surface preferably eliminates standing waves by changing the path lengths. In one embodiment, a randomized path length is created by subdividing the reflective surface into cells of random height, but with a reflective surface smaller than the image of the feed horn, such that a large number of cells are in the field of view of the feed horn. Such a reflective surface is similar to specular diffusers used as wall coverings in architectural engineering to enhance the reverberant environment of a performance space by creating a surface that provides variation in the path lengths of reflections from walls and ceilings.

Figure 1:
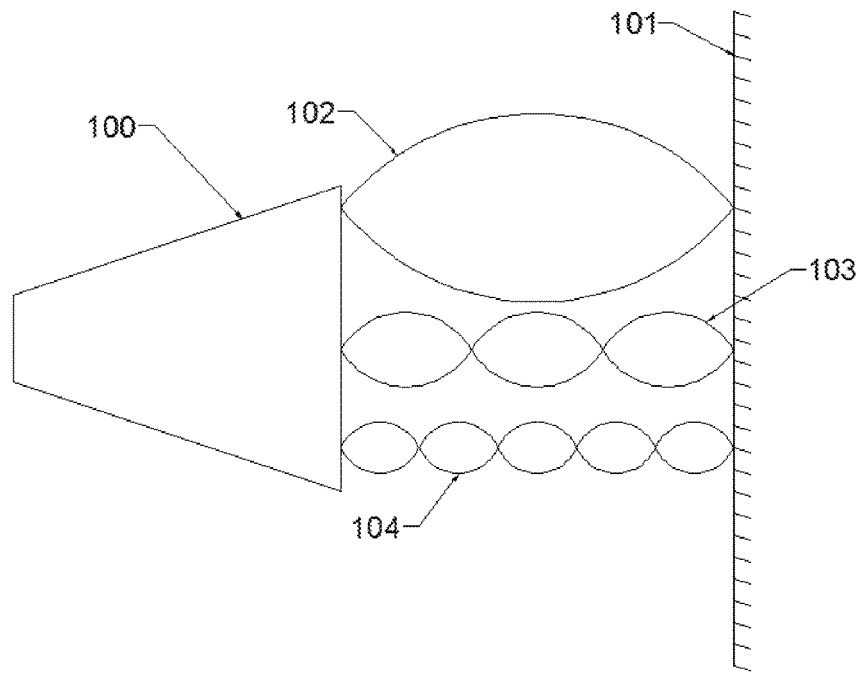
FIG. 1 depicts a typical feed horn receiver calibration.
Figure 2:
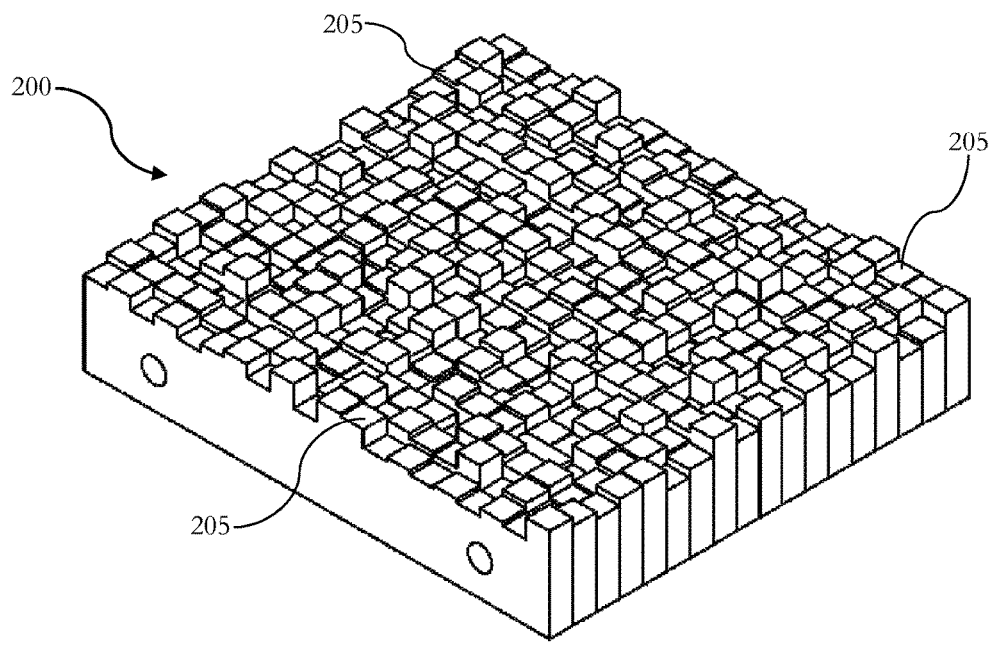
FIG. 2 depicts an embodiment of an inventive surface.

FIG. 2 depicts an embodiment of a randomized reflective surface 200 of the invention. In the preferred embodiment, surface 200 is a plate of non-ferrous, conductive material. For example, surface 200 can be aluminum, copper, gold, brass, or silver. Additionally, surface 200 may be made of a non-conducive material that is sufficiently rigid to maintain its shape under stress, coated with a conductive material in a manner to preserve the dimensions and relief of the surface prior to coating.

In the preferred embodiment, the surface 200 is square, however the surface 200 can be rectangular, circular, triangular, ovular, or of another shape. Preferably, the dimensions of the surface 200 is chosen such that the main (or bore sight) lobe of the feed horn is contained within the perimeter of the surface 200 to a power level greater than 25 dB below the power level at the center of the main lobe (e.g. the surface 200 preferably reflects the main lobe to a taper of 25 dB) when the main lobe is centered on the surface 200. The distance between the feed horn and the surface is the length of the side of the surface divided by twice the tangent of the 25 dB taper angle. For example, a feed horn having a 25 dB taper of 15 degrees would have a surface of 5 inches by 5 inches placed 9.3 inches away from the aperture of the feed horn, while a feed horn a 25 dB taper of 30 degrees would have a surface of 10 inches by 10 inches placed 8.66 inches away from the aperture of the feed horn.

In the preferred embodiment, surface 200 is divided into a series of cells 205. Preferably, cells 205 make up a square grid. However, cells 205 can be circular, triangular, rectangular, or of another shape. Preferably, all cells 205 are of the same dimension. For example, each square cell 205 can have sides that are greater than one wavelength at the lowest frequency of the frequency band of interest. In the embodiment shown in FIG. 2, there are 400 cells 205 (20 cells per row with 20 rows). Therefore, in a 5×5 inch surface with 400 cells, each cell is 0.25×0.25 inches. Preferably, each cell 205 has sharp corners and flat tops, with the tops parallel to the other cells' 205 tops.

Each cell 205 is preferably of a random height above a baseline height. For example, each cell 205 can be a random integer multiple of ¼ wavelength at the center frequency of the frequency band of interest. Preferably, the integer is between zero and one hundred, more preferably between zero and fifty, and more preferably between zero and twenty. Additionally, each cell 205 is of a different height above the base line from the height of adjacent cells 205. Adjacent cells 205 also preferably do not have a height difference of one wavelength at the center frequency of the frequency band of interest. Preferably, each surface 200 designed for a specific frequency band of interest will also work for odd-integer multiples of the specific frequency band of interest.

Figure 3:
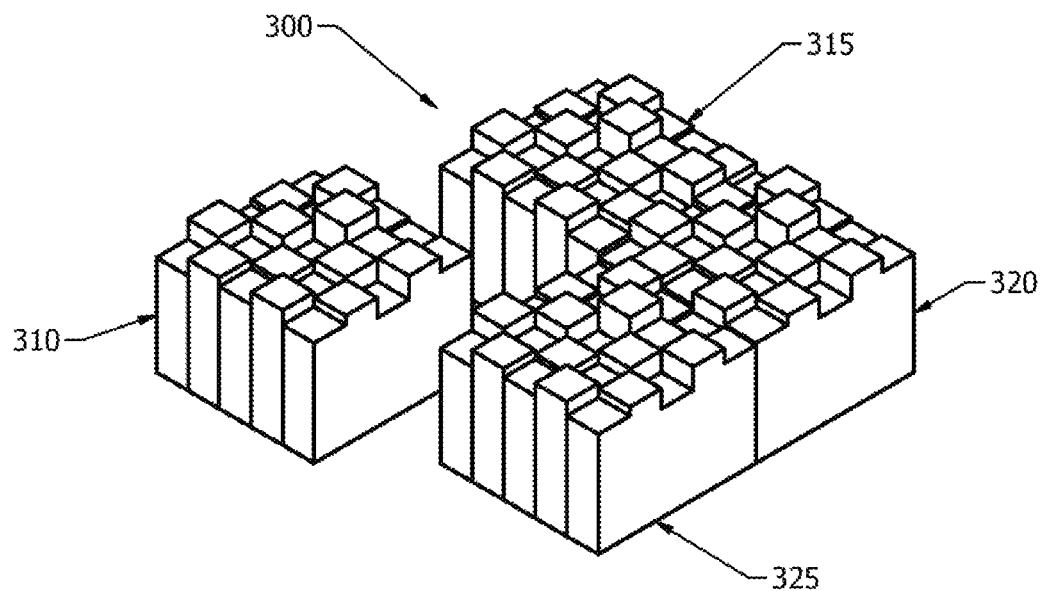
FIG. 3 depicts another embodiment of an inventive surface.

FIG. 3 depicts another embodiment where only a portion of the surface 300 has cells of random height. The remaining portion of surface 300 is a repeat of the random portion. For example, in portion 310, the cells are arranged randomly, while portions 315, 320, and 325 are identical to portion 310. Portions 315, 320, and 325 can be positioned in the same arrangement as portion 310 or rotated 90, 180, or 270 degrees when rotation does not cause two same-height cells to be adjacent. While four identical portions are shown in FIG. 3, another number of identical portions can comprise surface 300.

Figure 4:
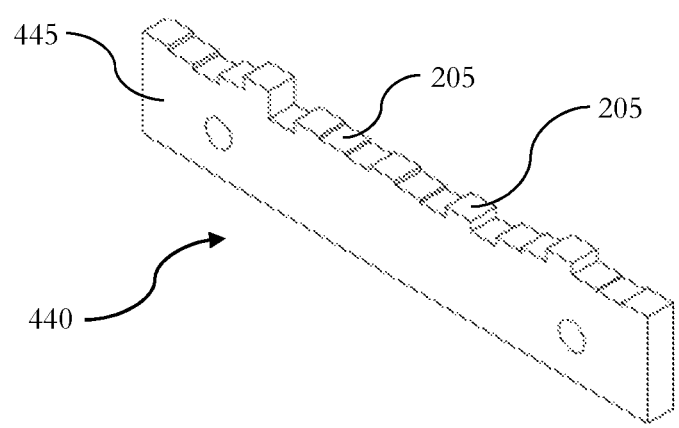
FIG. 4 depicts a portion of an embodiment of an inventive surface prior to assembling the inventive surface.

FIG. 4 depicts a row 440 of cells 205 for surface 200. Each row 440 is comprised of a plank of material 445 and a plurality of cells 205. Plank 445 is preferably as wide as one cell 205 and as long as the desired length of surface 200. Thereby, a plurality of rows 440 can be arranged adjacent to each other to form surface 200. Rows 440 can be affixed to each other by nuts and bolts, threaded rods, adhesive, welds, friction, tongue and groove joints, hook and loop fasteners, brads, cotter pins, or another fastening device.

In the preferred embodiment, each row 440 of surface 200 is constructed by milling out material from or depositing material onto plank 445. In the preferred embodiment, the lowest cell should be milled or deposited such that the minimum plate thickness is sufficient to maintain dimensional and planar rigidity. Minimum plate thickness is also preferably sufficient such that the attachment or positioning devices do not penetrate or obscure the surface 200. In other embodiments, surface 200 is constructed as a single unit. For example surface 200 can be laser etched, stamped, molded, or cast.

Figure 5:
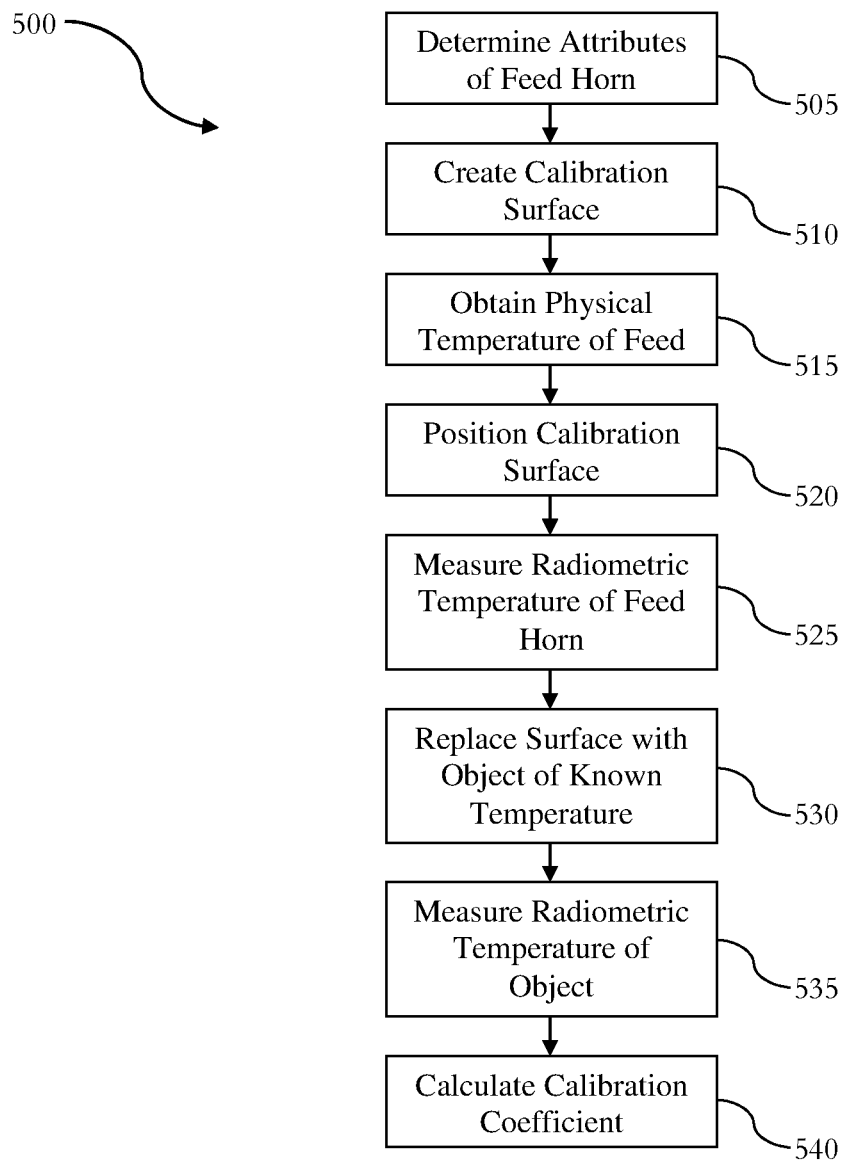
FIG. 5 depicts an embodiment of a method of calibrating a feed horn with an inventive surface.

FIG. 5 is an embodiment of a method 500 of calibrating a radiometer using surface 200. At step 505, the frequency band of the feed horn and the taper of the main lobe of the feed horn are determined. At step 510, a calibration surface is constructed having dimensions and cells in accordance with the attributes of the feed horn, as described herein. At step 515, the temperature of the feed horn is determined. For example, measuring the temperature of the surface of the horn by placing a thermometer or thermocouple in contact with the surface of the horn and noting the temperature measured. At step 520, the calibration surface is placed in a manner to reflect the electromagnetic signals of the feed horn. Preferably, the calibration surface is placed as if the surface was a flat plate or mirror. For example, the surface can be placed such that the plane parallel to the tops and/or bottoms of the cells and at the point of average cell height is the reflective plane and reflects parallel to the axis of the main feed horn lobe. At step 525, the temperature of the feed horn is measured based on the signal reflected from the calibration surface. For example, by determining the radiometric power level received by the horn as part of a radiometer using the horn, and using that power level in the calculation of the response of the receiver. At step 530, the surface is removed and replaced by an object of known temperature different than that of the feed horn. At step 535, the temperature of the object is measured based on the signal emitted from the object. For example, by determining the radiometric power level received by the horn as part of a radiometer using the horn, and using that power level in the calculation of the response of the receiver. At step 540 the actual temperature of the feed horn compared with the temperature of the feed horn as measured based on the signal reflected from the calibration surface is used along with the temperature of the object of known temperature compared with the temperature of the object as measured based on the reflected signal to obtain a calibration coefficient for the receiver.

While the randomized surface reflector is described herein with respect to a feed horn, the plate can be used in other industries and for other purposes where interfering with reflected wave signals may be desired. For example, the surface can be used in acoustic design to adjust the sound qualities of rooms, concert halls, microphones, instruments, or other devices. The surface can be used, for example, in antennas to improve transmission and receiving performance by reducing the coherence of undesired reflections. Large areas of antenna support structures can, for example, be covered with randomized surface reflectors to break up a reflected wavefront into smaller reflected wavefronts and randomize the path lengths of these undesired reflections, reducing side lobes, ground spill and strength of other undesired, off-axis signals.

The surface can also be used in stealth technology to reduce or eliminate radar reflections. By making the surface of an object a randomized surface reflector the reflected radar wavefront will be many smaller reflected wavefronts that are not in phase, the aggregate of these returning a weaker signal giving the impression that the object is smaller than it actually is or possibly concealing the existence of the object entirely.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising" includes the terms "consisting of" and "consisting essentially of," and the terms comprising, including, and containing are not intended to be limiting.

The invention claimed is:

1. A randomized surface reflector, comprising:
   a plate;
   a plurality of electromagnetic wave reflective cells arranged on the plate, each cell having a randomly determined height above a baseline, wherein each cell is a geometric shape and the cells are arranged in a grid and each cell has sides that are greater than one wavelength at a lowest frequency of a frequency band of interest.

2. The randomized surface reflector of claim 1, wherein each cell is of a different height above the baseline then the height of adjacent cells.

3. The randomized surface reflector of claim 1, wherein the random height is a random integer multiple of ¼ wavelength at a center frequency of a frequency band of interest.

4. The randomized surface reflector of claim 3, wherein the integer is between zero and twenty.

5. The randomized surface reflector of claim 1, wherein each cell has a flat top and sides perpendicular to the flat top.

6. The randomized surface reflector of claim 1, wherein the plate is comprised of a non-ferrous, conductive material.

7. The randomized surface reflector of claim 1, wherein the plate is comprised of a plurality of repeating sections of cells.

* * * * *